United States Patent
Warrian et al.

(10) Patent No.: US 9,310,667 B2
(45) Date of Patent: Apr. 12, 2016

(54) ORIENTATION SYSTEM FOR IMAGE RECORDING DEVICES

(71) Applicants: Kevin J. Warrian, Calgary (CA); Adrian Gooi, Winnipeg (CA); Patrick Gooi, Calgary (CA)

(72) Inventors: Kevin J. Warrian, Calgary (CA); Adrian Gooi, Winnipeg (CA); Patrick Gooi, Calgary (CA)

(73) Assignees: Kevin J. Warrian, Calgary (CA); Patrick Gooi, Calgary (CA)

(*) Notice: Subject to any disclaimer, the term of this patent is extended or adjusted under 35 U.S.C. 154(b) by 0 days.

(21) Appl. No.: 14/464,790

(22) Filed: Aug. 21, 2014

(65) Prior Publication Data

US 2016/0041451 A1     Feb. 11, 2016

(30) Foreign Application Priority Data

Aug. 6, 2014   (WO) ................ PCT/CA2014/050738

(51) Int. Cl.
  *G03B 13/10*    (2006.01)
(52) U.S. Cl.
  CPC ....................... *G03B 13/10* (2013.01)
(58) Field of Classification Search
  USPC .......................................... 396/378
  See application file for complete search history.

(56) References Cited

U.S. PATENT DOCUMENTS

| | | |
|---|---|---|
| 6,178,297 B1 | 1/2001 | Ting |
| 6,516,151 B2 | 2/2003 | Pilu |
| 7,414,669 B2 | 8/2008 | Chang et al. |
| 8,531,590 B2 | 9/2013 | Naimark |
| 8,761,594 B1* | 6/2014 | Gross et al. ................... 396/155 |
| 2007/0159598 A1* | 7/2007 | Yancey et al. ................ 351/206 |
| 2008/0112700 A1* | 5/2008 | Foxenland et al. ........... 396/148 |
| 2013/0021491 A1* | 1/2013 | Lee et al. ................... 348/222.1 |

OTHER PUBLICATIONS

International Search Report and Written Opinion of PCT/CA2014/050738 mailed Mar. 9, 2015.

* cited by examiner

*Primary Examiner* — Clayton E Laballe
*Assistant Examiner* — Dennis Hancock
(74) *Attorney, Agent, or Firm* — McMillan LLP

(57) ABSTRACT

An image recording device having a projected viewfinder is described that projects individual, or multiple sets of synchronized framing beams onto a target image that are coaxially aligned with the field of view of the camera. The set of framing beams is projected onto the target image beyond the scope of the field of view being recorded by the image recording device but still within the field of vision of the operator of the device. In this way, the operator of the image recording device will be able to clearly see the framing beams identifying the limits of the recorded areas, while not having any portion of the field of view of the image recording device obscured by the framing beams themselves.

40 Claims, 10 Drawing Sheets

ORIENTATION SYSTEM FOR IMAGE RECORDING DEVICES

CROSS-REFERENCE TO RELATED APPLICATIONS

This application claims the benefit and priority of PCT Application No. PCT/CA2014/050738 filed 6 Aug. 2014. The entire disclosure of the above application is incorporated herein by reference.

FIELD OF THE INVENTION

The present invention relates to the field of image recording devices and, in particular, to an orientation system for image recording devices that involves a projected viewfinder that allows a user to accurately and independently establish a field of view for a recording device.

BACKGROUND

Technological advances have resulted in the development of a variety of electronic multi-function image capture devices to meet the wide range of consumer demands. Despite such advancements, however, determining the field of view of the image capture device is oftentimes limited to the use of a viewfinder or a liquid crystal (LCD) display. These methods place extreme limitations on the versatility of such devices since the user is required to look through the viewfinder or at an LCD display, instead of the object being recorded, in order to establish the desired field of view.

Certain applications, in particular real-time photography and videography, often require constant correction of the position of the device to ensure that the images of interest are being recorded. The challenge of real-time recording is heightened with point-of-view recording, particularly where highly skilled activities are involved. Specifically, during a highly skilled activity (e.g., extreme or recreational sports, technical procedures, etc.), the user is generally not able to constantly ensure that the images of interest are within the field of view for accurate recording, or the user risks making errors in the activity they are performing. In this regard, wearable point-of-view (POV) image recording devices, have made point-of-view recording widely accessible in a broad spectrum of applications, however, there remains a need for systems that will allow the user to independently determine the desired field of use during an activity to ensure accurate recording.

International Patent Publication No. WO 93/13452 describes a camera having an aiming mechanism comprising a light emitting device that projects a light beam into the camera's field of view to produce a light pattern visible on an object within the field of view. A shutter trigger is connected to the light emitting device and the autofocus system such that when the trigger is depressed a certain distance, the light emitting device and autofocus system are actuated. Depressing the trigger further causes the camera to take a picture while simultaneously deactivating the light emitting device and autofocus system so that the light beam does not appear in the photograph.

U.S. Pat. No. 6,191,818 describes a viewfinder unit that projects a frame target image or a cross-hair image onto the subject that is in the field of view. The projected frame target image is produced in short pulses of high intensity light which are timed to alternate with the charging of a video capture array. In this way, the video recording array and the frame target image are not activated at the same time such that the projections are not captured by the image sensor of the video camera. The operator of the video camera and bystanders, however, will be able to see the video camera's field of view projected on the subject being filmed by the video camera.

U.S. Pat. No. 8,531,590 describes a behind-the-lens tally light that is emitted from a camera to illuminate substantially all objects within the field of view of the camera, but substantially no objects outside of the field. In this way, people within the field of view can know that they are within the field of view because they can see the tally light. People outside the field of view can similarly know that they are not within the field of view because they cannot see the tally light. The intensity of the tally light is controlled such that it can be seen by those in the environment operating the device, but is intended not to be bright enough to alter the image recording.

Advances in image recording, particularly in real-time point-of-view recording, has created a demand for a system that allows the user to accurately and independently establish the field of view for a recording without compromising the quality of the recording, or in situations where the user is performing the activity being recorded, causing a distraction to the user and thereby interfering with the performance of the activity.

This background information is provided for the purpose of making known information believed by the applicant to be of possible relevance to the present invention. No admission is necessarily intended, nor should be construed, that any of the preceding information constitutes prior art against the present invention.

SUMMARY

Disclosed herein are exemplary embodiments pertaining to an orientation system for image recording devices that involves a projected viewfinder for image recording devices. In accordance with one aspect, there is described an image recording device having a projected viewfinder for establishing an outer boundary of a field of view for a target image, comprising: an objective lens having a field of view; and at least one set of light beam emitters, each of the light beam emitters spatially positioned around an outer perimeter of the objective lens, wherein the at least one set of light beam emitters projects a corresponding set of framing beams which circumscribes at least in part said outer boundary of the field of view of the objective lens and which is projected onto the target image beyond the scope of the field of view of the objective lens, thereby avoiding interference with the field of view. In accordance with certain embodiments, the at least one set of light beam emitters comprises at least one light beam emitter. In further embodiments, the at least one set of light beam emitters comprises four light beam emitters.

In accordance with another aspect, there is described an image recording device having a projected viewfinder for establishing an outer boundary of a field of view for a target image, comprising: a variable focal length objective lens having a variable field of view; multiple sets of light beam emitters, each set of light beam emitters positioned around an outer perimeter of the variable focal length objective lens at incrementally greater distances from the variable focal length objective lens, wherein each set of light beam emitters projects a corresponding set of framing beams which circumscribes at least in part said outer boundary of the field of view of the objective lens and which is projected onto the target image beyond the scope of the field of view of the variable focal length objective lens, thereby avoiding interference with the field of view; and a controller for synchronizing the multiple sets of light beam emitters to project the set of framing beams that corresponds to a preset level of magnification of the variable field of view of the variable focal length objective lens. In accordance with certain embodiments, each set of light beam emitters comprises at least one light beam emitter. In accordance with other embodiments, each set of light beam emitters comprises four light beam emitters.

In accordance with a further aspect, there is described a method for generating a projected viewfinder for establishing a field of view for a target image, comprising: directing an objective lens of an image recording device at the target image to form a field of view; and projecting a set of framing beams coaxial to the field of view of the objective lens onto the target image, wherein the set of framing beams circumscribes at least in part an outer boundary of the field of view of the objective lens which is projected on the target image beyond the scope of the field of view to visibly indicate the field of view being recorded to an operator of the image recording device without interference with the field of view being recorded. In accordance with one embodiment, the set of framing beams is projected from a corresponding set of light beam emitters, each of the light beam emitters spatially positioned around the outer perimeter of the objective lens. In accordance with a further embodiment, the set of framing beams comprises at least one framing beam projected from a corresponding set of at least one light beam emitter.

DRAWINGS

These and other features of the invention will become more apparent in the following detailed description in which reference is made to the appended drawings.

DETAILED DESCRIPTION OF THE INVENTION

Figure 1:
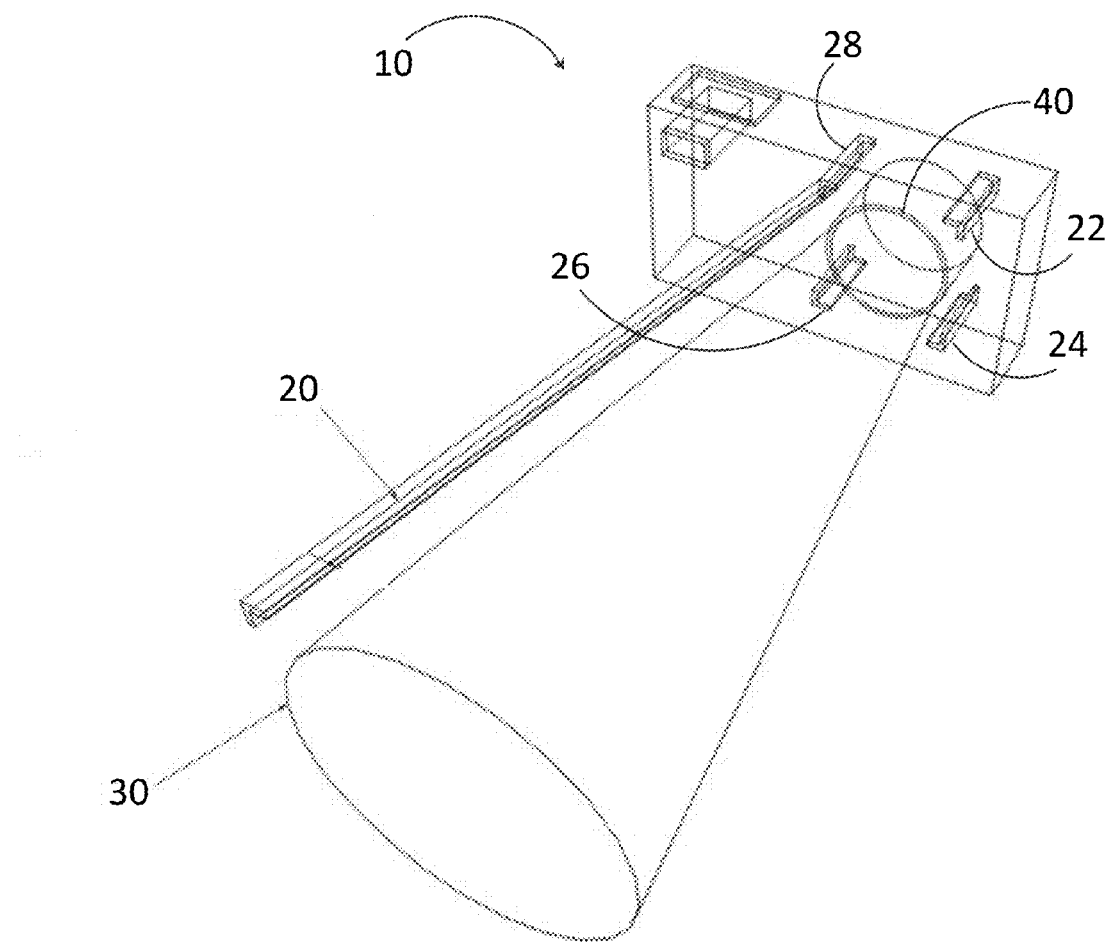
FIG. 1 is a perspective view of a camera having a projected viewfinder, according to embodiments of the present disclosure, illustrating a projected framing beam relative to the field of view.

The human field of vision is approximately 180 degrees in the horizontal meridian and 120 degrees in the vertical field. Image recording devices, however, are generally designed to record images with fields of view that are smaller than the human field of vision. Specifically, target objects and/or target activities are typically recorded with smaller fields of view and/or at higher magnifications and, as such, the field of view for a given recording will have a corresponding reduction in the horizontal and vertical dimensions.

The embodiments of the present disclosure take advantage of this fact that the field of view of interest during a particular recording is typically smaller than the field of vision of the operator. In particular, an image recording device having a projected viewfinder is described that projects individual, or multiple sets of synchronized framing beams onto a target image beyond the field of view being recorded by the image recording device but still within the field of vision of the operator of the device. In this way, the operator of the image recording device will be able to clearly see the framing beams identifying the limits of the recorded areas, while not having any portion of the field of view of the image recording device obscured by the framing beams themselves. Thus, operators of the device are less likely to be distracted by projected lights, while recording the target object and/or target activity of interest. This aspect is particularly desirable when the operator wishes to record their own performance of a skilled activity using a point-of-view recording, for example.

DEFINITIONS

Unless defined otherwise, all technical and scientific terms used herein have the same meaning as commonly understood by one of ordinary skill in the art to which this invention belongs.

As used herein, the term "camera", "image recording device", "video recording device", "video recorder", "movie camera", "video camera", and "image capture device" are used interchangeably to refer to any electronic device that captures, films, records, and/or transmits pictures, videos, movies, films, photographs, or other visual images digitally, on film, or in any other form or medium.

As used herein, the term "about" refers to an approximately +/−10% variation from a given value. It is to be understood that such a variation is always included in any given value provided herein, whether or not it is specifically referred to.

Embodiments of the present disclosure will now be described by reference to FIGS. 1 to 10, which show representations of a projected viewfinder for image recording devices according to the present disclosure.

According to the embodiments described herein, a projected viewfinder of the present disclosure is for application in an image recording device. For ease of reference, the projected viewfinder is described throughout the present disclosure in reference to a camera, however, it will be understood that the projected viewfinder can be used with other image recording devices, for example movie cameras, video cameras, POV cameras, and smart device image recording devices (e.g., phone, tablet), etc. The basic construction and operation of a camera is well known and will not be described in detail herein.

Coaxially Aligned Projected Viewfinder

Figure 2:
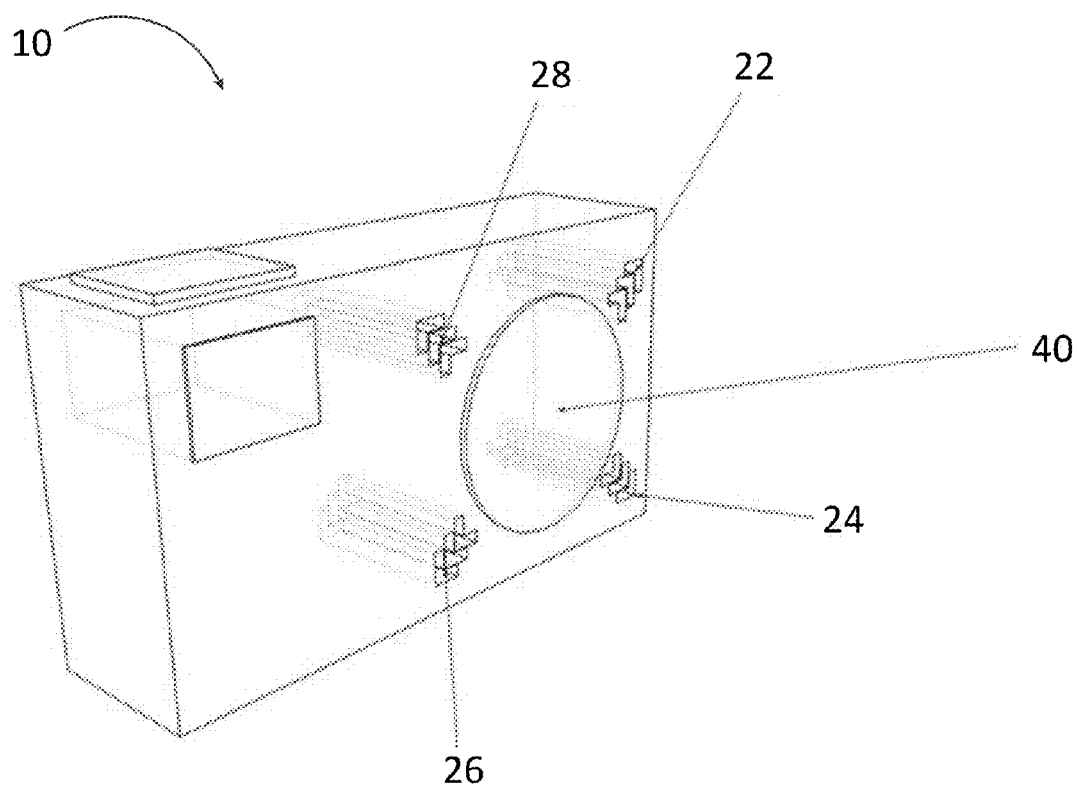
FIG. 2 is a front perspective view of a camera having a projected viewfinder, according to embodiments of the present disclosure, as shown in FIG. 1.

Referring to FIGS. 1 and 2, a projected viewfinder for image recording devices of the present disclosure is illustrated with a camera 10. According to certain embodiments, the camera 10 can be a point-of-view (POV) camera. The camera 10 includes an objective lens 40 through which a field of view 30 is established for recording a target image or target activity. The camera 10 further includes at least one set of light beam emitters 22, 24, 26, 28, which are each spatially positioned around the outer perimeter of the objective lens 40 to circumscribe at least in part an outer boundary of a field of view for the target image. According to certain embodiments, the at least one set of light beam emitters 22, 24, 26, 28, form a respective frame around the outer perimeter of the objective lens. According to other embodiments, the at least one set of light beam emitters form reference point(s) that at least in part circumscribe an outer boundary of the field of view.

The number and arrangement of individual light beam emitters around the outer perimeter of the objective lens can vary and, according to certain embodiments, can be determined by the shape of the field of view 30. As shown in FIG. 1, the field of view 30 may be circular or ovoid in shape, however, the field of view 30 may take other shapes. For example, the field of view 30 may be rectilinear, such as a rectangular or square field of view 30. Thus, the number and arrangement of light beam emitters around the outer perimeter of the objective lens may be determined by the shape of the field of view 30.

According to further embodiments of the present disclosure the camera 10 can include one or more sets of light beam emitters wherein each set includes a single or a plurality of light beam emitters. According to certain embodiments, each set of light beam emitters can have one light beam emitter that forms a reference point to partially circumscribe an outer boundary of the field of view. According to other embodiments, each set of light beam emitters can have at least two light beam emitters. According to preferred embodiments, each set of light beam emitters can have four light beam emitters.

According to certain exemplary embodiments as illustrated in FIG. 1, the camera 10 includes four light beam emitters 22, 24, 26, 28 positioned around the outer perimeter of the objective lens 40 at an equal distance apart to create a square-shaped arrangement. According to other embodiments, four light beam emitters 22, 24, 26, 28 are positioned around the outer perimeter of the objective lens 40 at an unequal distance apart to create a rectangular-shaped arrangement around the perimeter of the objective lens 40. According to further embodiments, the light beam emitters are arranged in a circular or ovoid arrangement around the outer perimeter of the objective lens.

Referring to FIGS. 1 to 10, activation of the light beam emitters 22, 24, 26, 28 to emit light projects a corresponding set of framing beams 20 that are each coaxial to the field of view 30 of the objective lens 40. According to certain embodiments, the light beam emitters 22, 24, 26, 28 are activated in unison. According to other embodiments, each of the light beam emitters 22, 24, 26, 28 can be separately activated and synchronized by a controller (not shown) such that the pattern of projected framing beams can be variably controlled, for example.

Figure 10:
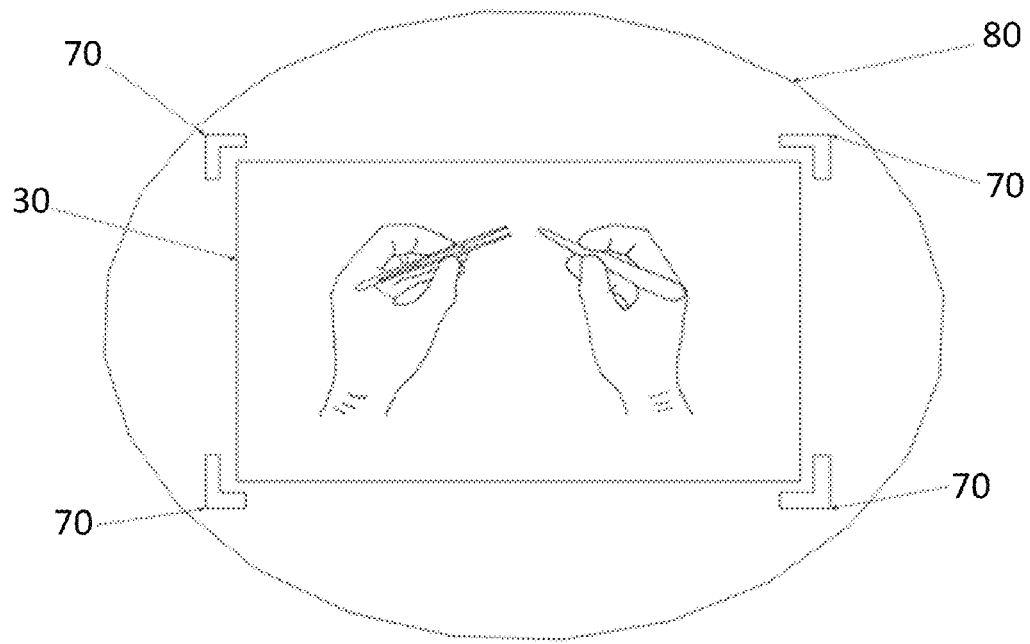
FIG. 10 is a schematic showing the location of the projected viewfinder relative to the camera field of view and the user's field of vision.

By ensuring that the framing beams 20 are projected coaxial to the angle delineating the camera's 10 field of view 30, the set of framing beams 20 is projected onto the target image beyond the scope of the field of view 30 of the objective lens 40. In this way, as shown in FIG. 10, the projected set of framing beams 20 forms a projected viewfinder 70 on the target image that is smaller than the operator's field of vision 80, and therefore visible to the operator of the camera 10, without interfering with the field of view 30 being recorded.

As illustrated in FIG. 1, the arrangement of the light beam emitters 22, 24, 26, 28 around the outer perimeter of the objective lens 40 ensures that the projected framing beam 20 remains coaxially aligned to the angle delineating the camera's 10 field of view 30 along the entire length of the projected framing beam 20 irrespective of the distance of the objective lens 40 from the target image. In this way, the projected viewfinder, according to the described embodiments, remains projected on the target image beyond the scope of the field of view 30 of the objective lens 40 as the camera 10 is moved towards and away from a target image. In a preferred embodiment, the light beam emitters project highly collimated light, so that there is minimal expansion of the projected framing beam 20 from the light beam emitter 28 as the distance from the camera 10 is increased. Therefore, at all useful distances from the camera 10, the projected viewfinder does not interfere with the field of view 30 of the camera 10.

The operator is therefore able to establish a field of view for the target image or target activity of interest without necessarily having to guide the camera 10 through the viewfinder or the LCD display of the camera 10. Instead, the operator is able to establish a field of view for the target image or target activity by using the projected viewfinder of the present disclosure. In this way, the operator does not necessarily have to take his eyes off the target image or target activity itself. According to further embodiments, this feature also allows the operator to perform the target activity being recorded without interruption. For example, the operator can freely perform highly skilled activities such as extreme or recreational sports, technical procedures, surgical procedures, etc., and independently record such a performance with accuracy without being distracted by the projected viewfinder being in the field of view or having to guide the field of view of the camera through a viewfinder, LCD display, or with the guidance of an assistant.

The shape of the light beam emitters 22, 24, 26, 28 determines the shape of the corresponding framing beam 20 projected onto the target image. According to the preferred embodiment shown in FIG. 2, each light beam emitter 22, 24, 26, 28 is shaped as a right-angled corner to project a correspondingly shaped viewfinder on the target image. According to alternative embodiments, however, the shape of the set of light beam emitters can take a variety of forms to project a correspondingly shaped viewfinder on the target image. For example, according to certain embodiments, the light beam emitters may be shaped as continuous lines connecting each corner shown in FIG. 2. Such an embodiment, for example, will project a box-shaped viewfinder on the target image. According to other embodiments, the light beam emitters may form a circular arrangement to create a circular shaped projected viewfinder on the target image.

The light beam emitters 22, 24, 26, 28 project the framing beam 20 through an aperture in the camera housing. The aperture may be covered by a transparent sheet or a lens, or it may be uncovered. The framing beam 20 can be a wide variety of types of light, including, but not limited to, lasers, optical collimators, light emitting diodes/LED, different wavelengths of light, and light projected to form different sizes and shapes around the target image. As discussed, the light can be highly collimated in order to limit the amount of diffraction and refraction, for example, of the projected framing beam 20. In this way, "bleeding" of the projected framing beam 20 into the field of view 30 is avoided irrespective of the distance of the camera 10 from the target image.

Figure 4:
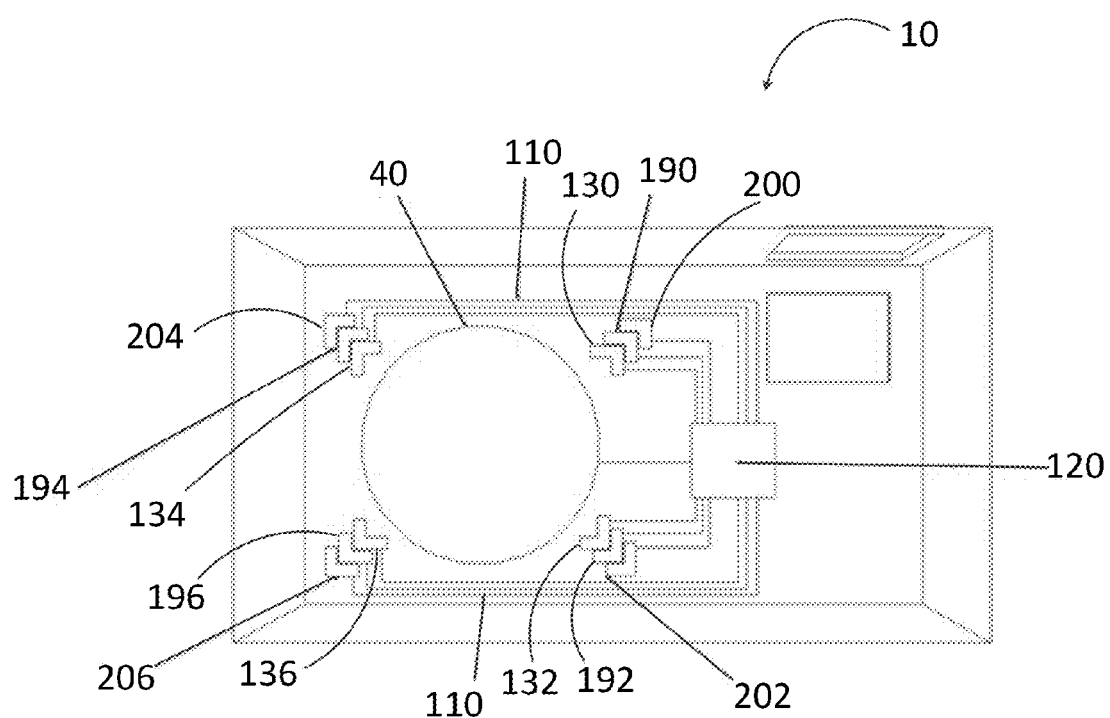
FIG. 4 is a cutaway view of the camera shown in FIG. 1 illustrating the internal circuitry, according to embodiments of the present disclosure.
Figure 5:
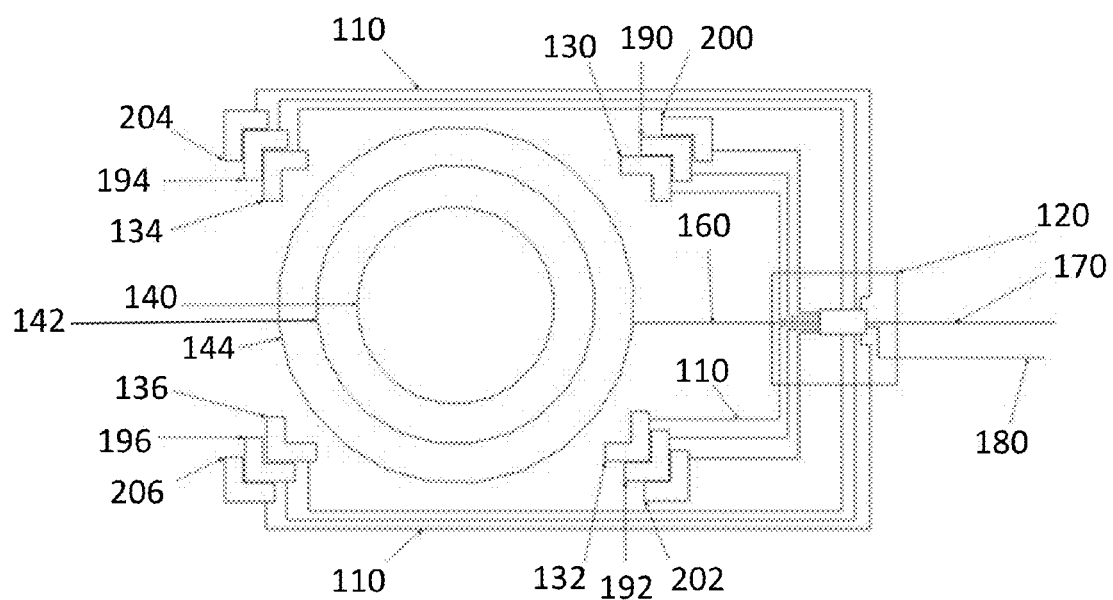
FIG. 5 is a schematic of the internal circuitry of the camera shown in FIG. 4, according to embodiments of the present disclosure.

Referring to FIGS. 4, and 5, the projected viewfinder for a camera 10 can be controlled by way of a simple circuit to activate and/or synchronize activation of the set of light beam emitters and, according to certain embodiments, coordinate activation with the level of magnification of the field of view in order to maintain coaxial alignment of the projected framing beams with the field of view of the camera 10 (discussed in more detail below). According to certain embodiments, the camera 10 can include one set of light beam emitters 22, 24, 26, 28. In other embodiments, the camera 10 can include more than one set of light beam emitters. In certain embodiments, as shown in FIGS. 4 and 5, the camera 10 can include multiple sets of light beam emitters. In a particular embodiment, the camera 10 can include three sets of light beam emitters 130, 132, 134, 136, 190, 192, 194, 196, 200, 202, 204, 206. Each of the light beam emitters 130, 132, 134, 136, 190, 192, 194, 196, 200, 202, 204, 206 is in communication 110 with a microprocessor 120 which is further in communication 160 with the optical lens 40.

Figure 3:
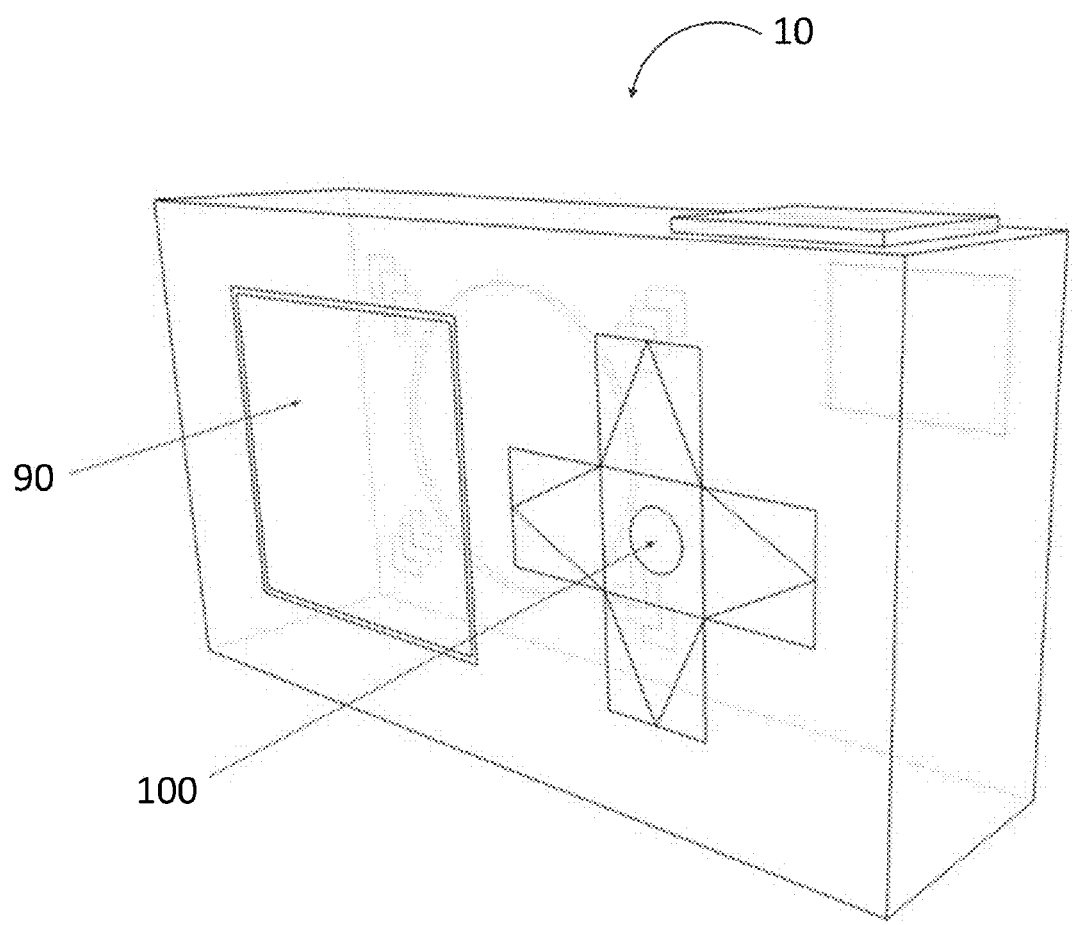
FIG. 3 is a rear perspective view of the camera shown in FIG. 1, according to embodiments of the present disclosure.

According to certain embodiments, the viewfinder can be externally controlled through various telecommunications technology such as, for example, Wi-Fi, Bluetooth, etc. Such telecommunications technology can allow the projected viewfinder to communicate with a wireless device, for example a Smartphone, tablet, computer, etc., In this way, the projected viewfinder may be remotely controlled. According to such embodiments, the microprocessor 120 can be in communication 170 with a wireless transmitter to allow such wireless control. According to further embodiments, the viewfinder can be manually controlled through input controls 100 that can typically be found on a camera 10 (FIG. 3). According to such embodiments, the microprocessor 120 can be in communication 180 with the camera's input controls 100 and the LCD display 90. According to certain embodiments, the camera 10 can include both wireless and manual control features. Furthermore, individuals skilled in the art will recognize that this invention could be applied to all image capture devices, regardless of configuration. For example, some image capture devices have separated the CCD image capture components from the microprocessor and have connected them by cable, or by wireless communications technology.

Variable Coaxial Alignment—Variable Magnification of the Field of View

The projected viewfinder of the present disclosure can be used with fixed focal length, also known as "prime", image recording devices. Such image recording devices offer an operator a fixed level of magnification. The field of view of a fixed focal length image recording device is, therefore, fixed at a single magnification. According to the most basic embodiments, the projected viewfinder of the present disclosure can comprise a single set of one or more light beam emitters 22, 24, 26, 28 calibrated for one preset level of magnification of the optical lens 40 (FIG. 1). In this way, the projected viewfinder of the present disclosure can be adapted for fixed focal length image recording devices.

The projected viewfinder of the present disclosure can also be adapted for use with variable focal length, otherwise known as "zoom", image recording devices. Such image recording devices offer an operator multiple pre-set or continuously adjustable levels of magnification. The field of view of a variable focal length image recording device can, therefore, be modified or varied between various levels of magnification. According to embodiments of the present disclosure, the projected viewfinder of the present disclosure can comprise a single set of adjustable light beam emitters 22, 24, 26, 28, which can be adjusted to vary the angle of projection of the projected framing beam 20 relative to variation in the field of view 30. By controllably adjusting the angle of projection relative to a change in the level of magnification of the optical lens 40, the coaxial alignment of the projected framing beams 20 with the field of view 30 can be maintained. In this way, the projected viewfinder can be adjusted with variations in the level of magnification of the optical lens and the resulting field of view.

Figure 9:
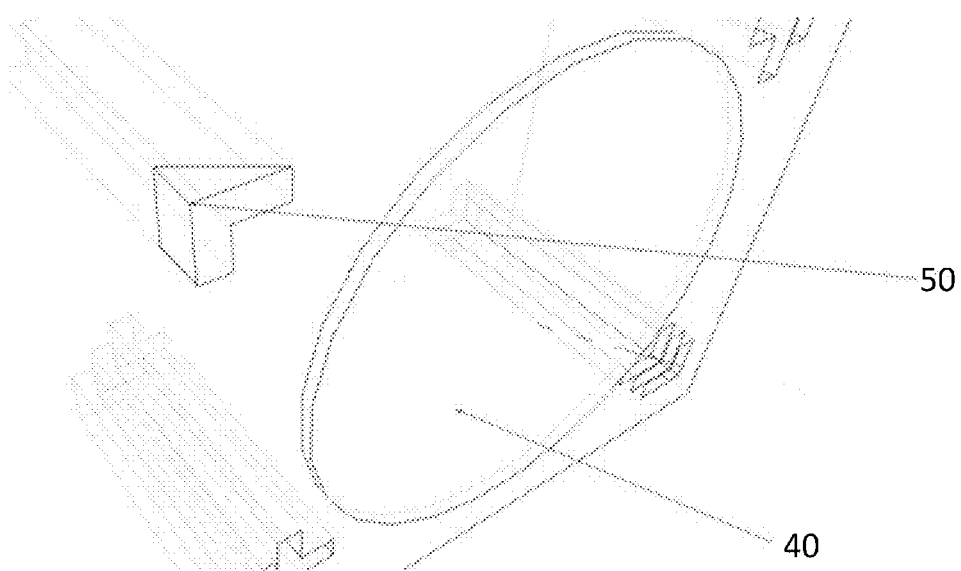
FIG. 9 is a magnified view of a light beam emitter relative to the objective lens of the camera shown in FIG. 1, according to embodiments of the present disclosure.

The angular position of the adjustable light beam emitters 22, 24, 26, 28 can be achieved using a variety of methods in order to adjust the angle of projection of the projected framing beams to ensure coaxial alignment of the framing beams with the field of view 30. For example, the light beam emitters can be controllably adjusted by a set of electronic motors (not shown) coordinated by the microprocessor 120. According to other embodiments, the angular position of the adjustable light beam emitters 22, 24, 26, 28 can be achieved by sets of prisms, each with different powers, 50 coordinated by a microprocessor 120 (FIG. 9). Further embodiments contemplated can include sets of light beam emitters with coordinated reflective mirrors that ensure that emitted light from the light beam emitters are coaxial to the image recording device's field of view. In even further embodiments, electronically controlled adjustable liquid crystal display prisms are contemplated. As illustrated, any means for adjusting the angular position of the light beam emitters 22, 24, 26, 28 can be used to adjust the angular position of the light beam emitters to ensure coaxial alignment of the projected framing beams 20 with the field of view 30.

As will be understood by those skilled in the art, determining the appropriate angular position of the adjustable light beam emitters will depend on the optical properties of the lens, as well as dimensions of the camera's sensor, determined by the particular camera manufacturer. In particular, the angular position of the adjustable light beam emitters will depend on the field of view of the particular camera which can be determined using methods known in the art, for example, by calculation or computation with computer modeling using ray tracing simulations. This data is then programmed into the camera's microprocessor (including but not limited to hardware, firmware, and software).

Figure 6:
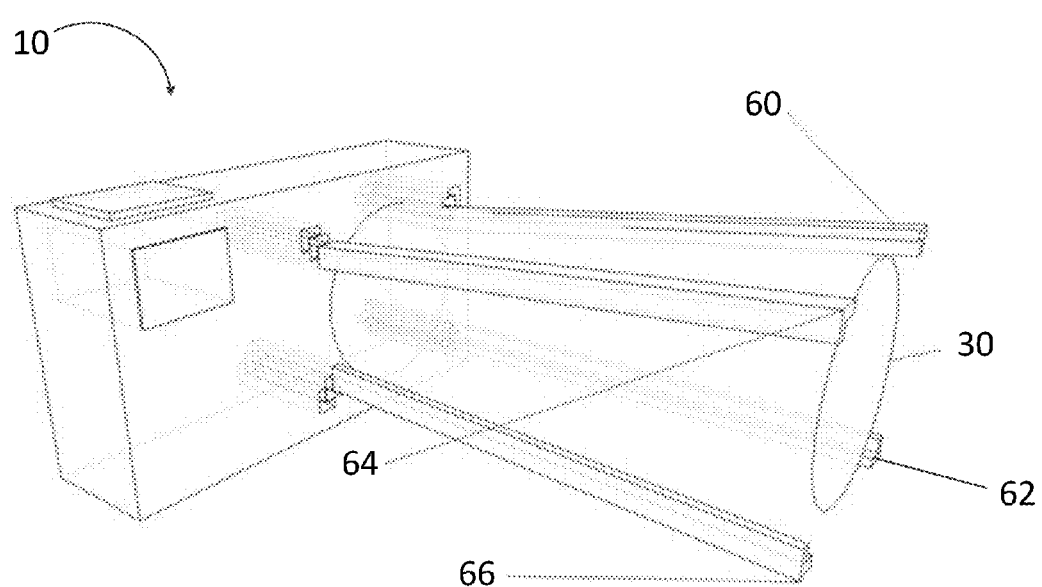
FIG. 6 is a perspective view of the camera shown in FIG. 1, according to embodiments of the present disclosure, set at a narrow field of view/high magnification.
Figure 7:
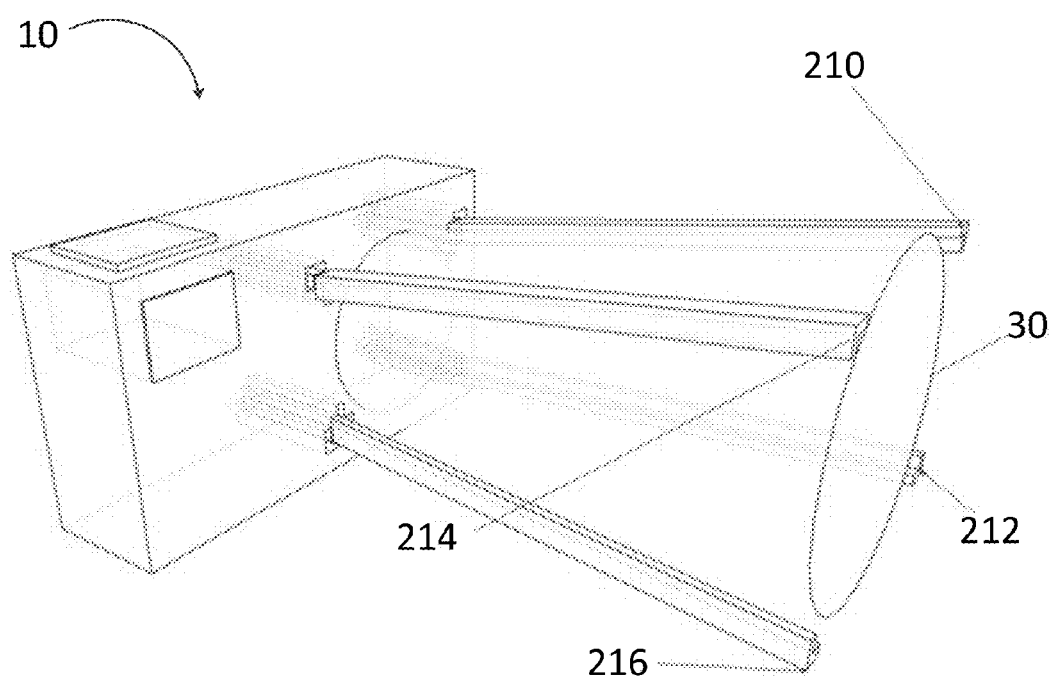
FIG. 7 is a perspective view of the camera shown in FIG. 1, according to embodiments of the present disclosure, set at a medium field of view/medium magnification.
Figure 8:
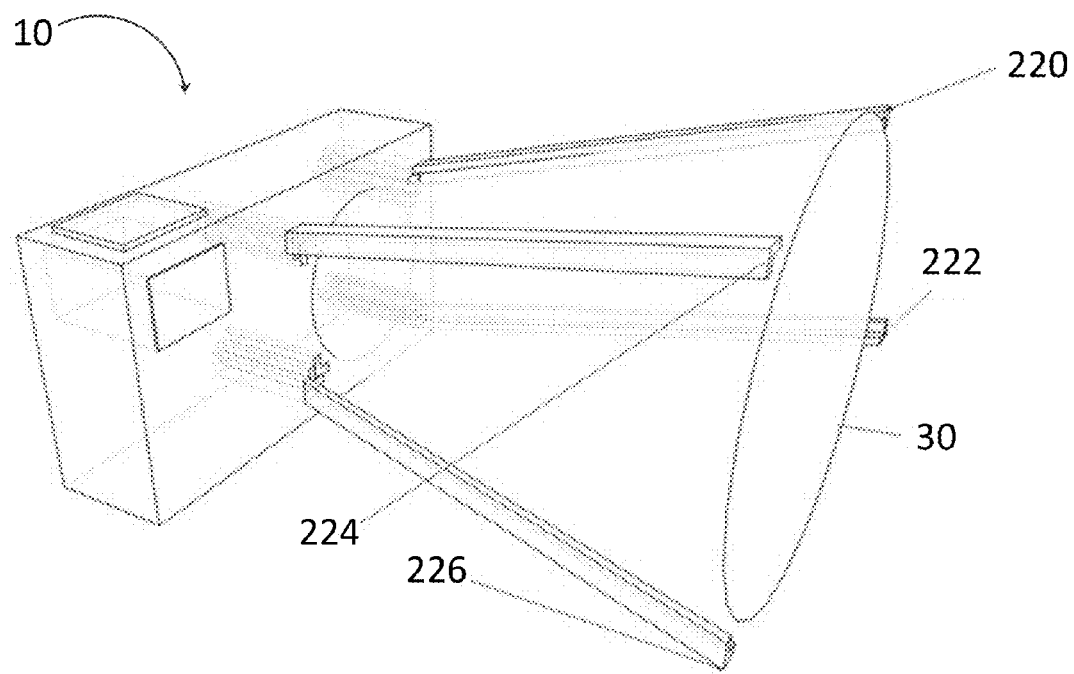
FIG. 8 is a perspective view of the camera shown in FIG. 1, according to embodiments of the present disclosure, set at a wide field of view/wide magnification.

Referring to FIGS. 6, 7, and 8, a projected viewfinder can be configured to vary with variations in the level of magnification of the field of view, according to alternative embodiments, by including multiple sets of light beam emitters 130, 132, 134, 136, 190, 192, 194, 196, 200, 202, 204, 206. Each set of light beam emitters 130, 132, 134, 136, 190, 192, 194, 196, 200, 202, 204, 206 is positioned around the outer perimeter of the objective lens 40 at incrementally greater distances to project a correspondingly wider set of framing beams 60, 62, 64, 66, 210, 212, 214, 216, 220, 222, 224, 226. For example, as illustrated in FIG. 6, a set of light beam emitters preset at a narrow field of view or high level of optic lens magnification will project a correspondingly narrow set of framing beams 60, 62, 64, 66 that remains in coaxial alignment with the narrow field of view. Should the magnification be modified to a medium field of view or medium magnification, for example, the narrow set of framing beams 60, 62, 64, 66 can be deactivated and a medium set of light beam emitters activated to project a corresponding set of framing beams 210, 212, 214, 216 (FIG. 7) that remains in coaxial alignment with the medium field of view. Similarly, should the magnification be modified to a wide field of view or wide magnification, the narrow or medium set of framing beams 60, 62, 64, 66, 210, 212, 214, 216 can be deactivated and a wide set of light beam emitters activated to project a corresponding set of framing beams 220, 222, 224, 226 (FIG. 8) that remains in coaxial alignment with the wide field of view.

In this way, the multiple sets of light beam emitters can be interchangeably activated and deactivated to project one corresponding set of framing beams 60, 62, 64, 66, 210, 212, 214, 216, 220, 222, 224, 226 at a time in order to coordinate with a change in a level of magnification of the field of view 30 of the objective lens 40. The coaxial alignment of the corresponding set of framing beams 60, 62, 64, 66, 210, 212, 214, 216, 220, 222, 224, 226 to the varying field of view 30 of the objective lens 40 is thereby maintained.

According to certain embodiments, the level of magnification of the field of view 30 of the objective lens 40 is variable between preset magnification levels. In such embodiments, a corresponding number of sets of light beam emitters are positioned around the objective lens to coordinate with each level of preset magnification level. Activation and deactivation of the multiple sets of light beam emitters 130, 132, 134, 136, 190, 192, 194, 196, 200, 202, 204, 206, can thereby accommodate each change to the field of view. According to embodiments of the present disclosure, activation and deactivation of the multiple sets of light beam emitters can be by manual control. According to further embodiments, activation and deactivation of the multiple sets of light beam emitters can be coordinated by a microprocessor, or a combination of manual controls and a microprocessor.

Operation

The projected viewfinder of the present disclosure can be self-contained within the image recording device, according to certain embodiments as illustrated in FIGS. 1 to 10. Alternatively, the projected viewfinder of the present disclosure can be an external device for attachment to an image recording device. In operation, the viewfinder of the present disclosure is intuitive to use. According to certain embodiments, for example, a projected viewfinder is generated by simply directing an objective lens 40 of an image recording device 10 at the target image to form a field of view 30, and projecting a set of framing beams 60, 62, 64, 66, 210, 212, 214, 216, 220, 222, 224, 226 coaxial to the field of view 30 of the objective lens 40 onto the target image. In this way, a set of framing beams 60, 62, 64, 66, 210, 212, 214, 216, 220, 222, 224, 226 is projected on the target image beyond the scope of the field of view 30 to visibly indicate the field of view 30 being recorded to an operator of the image recording device 10 without interference with the field of view 30 being recorded.

According to certain embodiments, the projected viewfinder can be adjusted to a varying level of magnification of the field of view 30. In such embodiments, the field of view 30 is modified, and the set of framing beams adjusted to an angle of projection that is in coaxial alignment to the field of view 30 at the modified level of magnification.

According to other embodiments, the projected viewfinder includes multiple light beam emitters 130, 132, 134, 136, 190, 192, 194, 196, 200, 202, 204, 206 to accommodate varying levels of magnification of the objective lens 40. In such embodiments varying the level of magnification of the field of view 30 is accommodated by deactivating the set of currently activated light beam emitters 130, 132, 134, 136, 190, 192, 194, 196, 200, 202, 204, 206, and activating a second set of light beam emitters 130, 132, 134, 136, 190, 192, 194, 196, 200, 202, 204, 206 that may be calibrated to the modified level of magnification. In this way, a corresponding second set of framing beams that is in coaxial alignment to the field of view at the varied level of magnification is projected to form the desired projected viewfinder.

As described, the projected viewfinder of the present disclosure allows the operator to establish a field of view for a target image or target activity of interest by simply directing an objective lens towards a target image or target activity and projecting the described viewfinder to frame the target image or target activity of interest. In this way, the operator does not necessarily have to take his eyes off the target image or target activity itself. According to embodiments, this feature also allows the operator to perform the target activity being recorded without interruption. According to certain embodiments, the projected viewfinder can be used for recording highly skilled activities performed by the operator of the camera. According to one embodiment, the projected viewfinder can be used for recording extreme or recreational sports. According to another embodiment, the projected viewfinder can be used for recording technical procedures. According to a particular embodiment, the projected viewfinder can be used for recording surgical procedures.

The disclosures of all patents, patent applications, publications and database entries referenced in this specification are hereby specifically incorporated by reference in their entirety to the same extent as if each such individual patent, patent application, publication and database entry were specifically and individually indicated to be incorporated by reference.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

What is claimed is:

1. An image recording device having a projected viewfinder for establishing an outer boundary of a field of view for a target image, comprising:
    an objective lens having a field of view; and
    at least one set of light beam emitters, each of the light beam emitters spatially positioned around an outer perimeter of the objective lens at incrementally greater distances to project a correspondingly wider set of framing beams, each set of framing beams corresponding to the at least one set of light beam emitters being interchangeably activated and deactivated to project one corresponding set of framing beams at a time,
    wherein the at least one set of light beam emitters projects a corresponding set of framing beams which circumscribes at least in part said outer boundary of the field of view of the objective lens and which is projected onto the target image beyond the scope of the field of view of the objective lens, thereby avoiding interference with the field of view;
    wherein activation and deactivation of the at least one set of light beam emitters is coordinated with a change in a level of magnification of the field of view of the objective lens to maintain the coaxial alignment of the corresponding set of framing beams to the field of view of the objective lens.

2. The image recording device according to claim 1, wherein the image recording device is a camera.

3. The image recording device according to claim 2, wherein the camera is a point-of-view (POV) camera.

4. The image recording device according to claim 1, wherein the at least one set of light beam emitters comprises at least one light beam emitter.

5. The image recording device according to claim 1, wherein the at least one set of light beam emitters comprises four light beam emitters.

6. The image recording device according to claim 5, wherein each of the four light beam emitters form a corner of a quadrangled frame around the outer perimeter of the objective lens.

7. The image recording device according to claim 6, wherein the framing beams are shaped as right-angled corners framing the field of view of the objective lens.

8. The image recording device according to claim 1, comprising one set of light beam emitters calibrated for one field of view having a preset level of magnification.

9. The image recording device according to claim 1, comprising one set of light beam emitters, wherein each of the light beam emitters has a respective angular position that is adjustable to a variation in a level of magnification of the field of view to maintain the coaxial alignment of the corresponding set of framing beams to the field of view of the objective lens.

10. The image recording device according to claim 9, wherein the angular position of the light beam emitters is adjustable by a set of electronic motors coordinated by a microprocessor.

11. The image recording device according to claim 9, wherein the angular position of the light beam emitters is adjustable by prisms coordinated by a microprocessor.

12. The image recording device according to claim 9, wherein the angular position of the light beam emitters is adjustable by variable liquid crystal display (LCD) prisms coordinated by a microprocessor.

13. The image recording device according to claim 9, wherein the angular position of the light beam emitters is adjustable by reflective mirrors set at different fixed positions and coordinated by a microprocessor.

14. The image recording device according to claim 9, wherein the image recording device comprises a zoom lens for continuous variation of the level of magnification of the field of view.

15. The image recording device according to claim 1, wherein the level of magnification of the field of view of the objective lens is variable between preset magnification levels.

16. The image recording device according to claim 1, wherein activation and deactivation of the multiple sets of light beam emitters is by manual control.

17. The image recording device according to claim 1, wherein activation and deactivation of the multiple sets of light beam emitters is by a microprocessor.

18. An image recording device having a projected viewfinder for establishing an outer boundary of a field of view for a target image, comprising:
    a variable focal length objective lens having a variable field of view;
    multiple sets of light beam emitters, each set of light beam emitters positioned around an outer perimeter of the variable focal length objective lens at incrementally greater distances from the variable focal length objective lens,
    wherein each set of light beam emitters projects a corresponding set of framing beams which circumscribes at least in part said outer boundary of the field of view of the objective lens and which is projected onto the target image beyond the scope of the field of view of the variable focal length objective lens, thereby avoiding interference with the field of view; and
    a controller for synchronizing the multiple sets of light beam emitters to project the set of framing beams that corresponds to a preset level of magnification of the variable field of view of the variable focal length objective lens.

19. The image recording device according to claim 18, wherein each set of light beam emitters positioned at incrementally greater distances from the variable focal length objective lens projects a correspondingly wider set of framing beams.

20. The image recording device according to claim 18, wherein each set of light beam emitters is interchangeably activated and deactivated to project one corresponding set of framing beams at a time.

21. The image recording device according to claim 20, wherein activation and deactivation of the multiple sets of light beam emitters is coordinated with a change in a preset level of magnification of the field of view of the objective lens.

22. The image recording device according to claim 21, wherein activation and deactivation of the multiple sets of light beam emitters is by manual control.

23. The image recording device according to claim 21, wherein activation and deactivation of the multiple sets of light beam emitters is by a microprocessor.

24. The image recording device according to claim 18, wherein each set of light beam emitters comprises at least one light beam emitter.

25. The image recording device according to claim 18, wherein each set of light beam emitters comprises four light beam emitters.

26. The image recording device according to claim 25, wherein each of the four light beam emitters form a corner of a quadrangled frame around the outer perimeter of the objective lens.

27. The image recording device according to claim 26, wherein the framing beams are shaped as right-angled corners framing the field of view of the objective lens.

28. A method for generating a projected viewfinder for establishing a field of view for a target image, comprising:
    directing an objective lens of an image recording device at the target image to form a field of view; and
    projecting a set of framing beams coaxial to the field of view of the objective lens onto the target image, wherein the set of framing beams circumscribes at least in part an outer boundary of the field of view of the objective lens which is projected on the target image beyond the scope of the field of view to visibly indicate the field of view being recorded to an operator of the image recording device without interference with the field of view being recorded
    varying a level of magnification of the field of view;
    deactivating the set of framing beams; and
    projecting a second set of framing beams that is in coaxial alignment to the field of view at the varied level of magnification.

29. The method according to claim 28, wherein the set of framing beams is projected from a corresponding set of light beam emitters, each of the light beam emitters spatially positioned around the outer perimeter of the objective lens.

30. The method according to claim 29, wherein the set of framing beams comprises at least one framing beam projected from a corresponding set of at least one light beam emitter.

31. The method according to claim 29, wherein the set of framing beams comprises four framing beams projected from a corresponding set of four light beam emitters, each of the light beam emitters spatially positioned around the outer perimeter of the objective lens.

32. The method according to claim 31, wherein each of the four light beam emitters form a corner of a quadrangled frame around the outer perimeter of the objective lens.

33. The method according to claim 32, wherein the framing beams are shaped as right-angled corners framing the field of view of the objective lens.

34. The method according to claim 28, wherein the set of framing beams is calibrated for one field of view having a preset level of magnification.

35. The method according to claim 28, further comprising:
varying the level of magnification of the field of view;
adjusting the set of framing beams to an angle of projection that is in coaxial alignment to the field of view at the varied level of magnification.

36. The method according to claim 28, wherein the image recording device is a camera.

37. The method according to claim 36, wherein the camera is a point-of-view (POV) camera.

38. The method according to claim 37, wherein the projected viewfinder is generated for establishing a field of view for recording a target activity performed by an operator of the camera.

39. The method according to claim 38, wherein the target activity performed by the operator is an extreme or recreational sport.

40. The method according to claim 38, wherein the target activity performed by the operator is a surgical procedure.

* * * * *